(12) United States Patent
Junod et al.

(10) Patent No.: US 8,460,604 B2
(45) Date of Patent: Jun. 11, 2013

(54) NONMAGNETIC MATERIAL FOR PRODUCING PARTS OR COATINGS ADAPTED FOR HIGH WEAR AND CORROSION INTENSIVE APPLICATIONS, NONMAGNETIC DRILL STRING COMPONENT, AND METHOD FOR THE MANUFACTURE THEREOF

(75) Inventors: Michel Junod, Pully (CH); Michael Gill, Edmonton (CA); Alain Tremblay, Co. Kildare (IE)

(73) Assignee: Mec Holding GmbH, Schwalbach (DE)

( * ) Notice: Subject to any disclaimer, the term of this patent is extended or adjusted under 35 U.S.C. 154(b) by 787 days.

(21) Appl. No.: 12/227,428

(22) PCT Filed: May 16, 2007

(86) PCT No.: PCT/EP2007/054797
§ 371 (c)(1), (2), (4) Date: Aug. 27, 2009

(87) PCT Pub. No.: WO2007/132020
PCT Pub. Date: Nov. 22, 2007

(65) Prior Publication Data
US 2010/0009089 A1 Jan. 14, 2010

(30) Foreign Application Priority Data

May 17, 2006 (EP) .................................... 06114096
Jun. 29, 2006 (EP) .................................... 06116298

(51) Int. Cl.
*C22C 30/00* (2006.01)
*B05D 1/08* (2006.01)
*H05H 1/24* (2006.01)

(52) U.S. Cl.
USPC ...... 420/586.1; 427/446; 427/569; 106/14.05

(58) Field of Classification Search
USPC .............. 420/586.1; 427/446, 569; 106/14.05
See application file for complete search history.

(56) References Cited

U.S. PATENT DOCUMENTS

| 3,986,842 A | 10/1976 | Quaas |
| 5,993,978 A | 11/1999 | Kim et al. |
| 6,482,534 B2 | 11/2002 | Itsukaichi et al. |
| 2005/0117984 A1 | 6/2005 | Eason et al. |
| 2006/0049234 A1 * | 3/2006 | Flak et al. ................. 228/112.1 |

FOREIGN PATENT DOCUMENTS

| GB | 1070039 | * | 5/1967 |
| GB | 2109417 | | 6/1983 |
| JP | 01087741 | | 3/1989 |
| JP | 08311630 | | 11/1996 |
| JP | 2001234323 | | 8/2001 |

* cited by examiner

Primary Examiner — Jessee R. Roe
(74) *Attorney, Agent, or Firm* — Horst M. Kasper

(57) ABSTRACT

In order to provide a nonmagnetic material for producing parts or coatings adapted for highly wear and corrosion intensive applications, said material comprising preformed particles made of tungsten carbide which are embedded in a metal phase made of a Ni-based alloy. It is suggested that the weight portion of said tungsten carbide particles is in the range between 30 wt. % and 65 wt. % and wherein the Ni-based alloy is a Nickel-Chromium-Molybdenum alloy comprising: (in wt. %):

Figure 1:
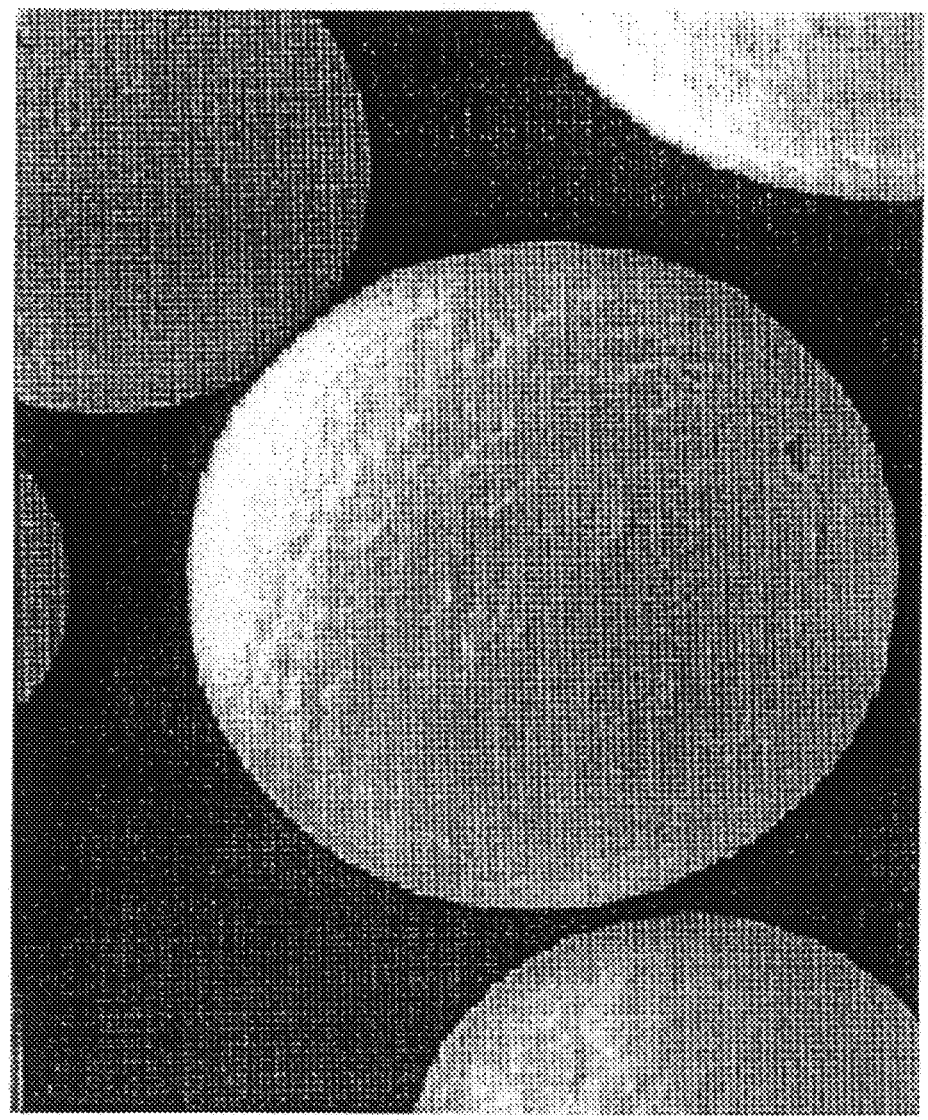

| Cr | 11.0.-30.0 |
| Mo | 5.0-25.0 |
| Fe | 0-10.0 |
| B | 0-5.0 |
| Co | 0-2.5. |

8 Claims, 2 Drawing Sheets

NONMAGNETIC MATERIAL FOR PRODUCING PARTS OR COATINGS ADAPTED FOR HIGH WEAR AND CORROSION INTENSIVE APPLICATIONS, NONMAGNETIC DRILL STRING COMPONENT, AND METHOD FOR THE MANUFACTURE THEREOF (b) CROSS-REFERENCE TO RELATED APPLICATIONS (not applicable)

(c) STATEMENT REGARDING FEDERALLY SPONSORED RESEARCH OR DEVELOPMENT (not applicable)

(d) THE NAMES OF THE PARTIES TO A JOINT RESEARCH AGREEMENT (not applicable)

(e) INCORPORATION-BY-REFERENCE OF MATERIAL SUBMITTED ON A COMPACT DISC (not applicable)

(f) BACKGROUND OF THE INVENTION (1) Field of the Invention

The present invention relates to a nonmagnetic material for producing parts or coatings adapted for highly wear and corrosion intensive applications, said material comprising preformed particles made of tungsten carbide which are embedded in a metal phase made of a Ni-based alloy.

The invention also relates to nonmagnetic component, especially for use in a drill string.

(2) Description of Related Art including information disclosed under 37 CFR 1.97 and 1.98

Furthermore, the invention relates to a method for the manufacture of such a component by applying a coating on a surface of a substrate adapted to form a component for highly wear and abrasion intensive applications by providing a nonmagnetic raw material in powder form or wire form, melting the material and depositing it on said surface of the substrate.

The drilling of holes or bores into underground formations and particularly, the drilling of oil and gas wells, is typically accomplished using an elongated "drill string" which initially carries the drill bit or other cutting tool, and which is constructed from a number of sections of tubular drill pipe which are coupled at their ends. As the drill bit penetrates deeper or further into an underground formation, additional sections of drill pipe are added to the drill string.

It is conventional practice to line the wall of a bore hole with steel piping as the length of that bore hole progressively increases. This steel piping is generally known as a bore hole "casing". The casing lines the bore to prevent the wall from caving in and to prevent seepage of fluids from the surrounding formations from entering the wellbore. The casing also provides a means for recovering the gas or the oil if the well is found to be productive.

A drill string can have a considerable length, and it is relatively flexible, being subject to lateral deflection, especially at the regions between joints or couplings. Lateral deflections can cause contacts between the drill string and the casing. In addition, the drilling operation may be along a curved or angled path, commonly known as "directional drilling". Such directional drilling, especially, causes frequent contact between portions of the drill string and the casing.

It will immediately be realized that the drill string, which frequently contacts the surrounding bore hole casing, inevitably causes frictional wear, increased shock and abrasion to itself, and similar wear or other damage to the surrounding casing. Additional wear and corrosion results from the abrasive slurry passing between the drill string and the casing even if they are not in direct contact.

Furthermore, drilling string components are often exposed to highly corrosive media such as multipercent sodium chloride solutions, magnesium chloride solutions as well as hydrogen sulfide and the like. Therefore, a high resistance to corrosion, especially stress corrosion cracking is required.

In order to eliminate or reduce the frictional wear, protection is provided along the length of the drill pipe string. This protection takes the form of welded, sprayed or brazed overlays applied around the circumference of the drill collar, to form "hardbands". The overlays may be applied directly to the drill pipe, or may also be applied to an annular body that surrounds the drill pipe It was also suggested that the drill string, or a part of it, is formed from rigid alloys provided with low friction bearing means between the drill string and the casing. The low friction bearing means may be coatings or inserts made of a low friction alloy, low friction ceramic or magnetic elements. For example, a low friction alloy insert could be formed from steel with ceramic elements inserted therein.

In a paper titled "Hardbanding for Drilling Unconsolidated Sand Reservoirs", presented at the IADC/SPE Asia Pacific Drilling Technology" held in Jakarta, 9-11 Sep. 2002, by J. Barrios, C. Alonso, E. Pedersen, A. Bachelot and A. Broucke, it is reported that tungsten carbide grains are used to prepare tungsten carbide-steel composites in order to increase the hardness of hardbanding material applied to a contact surface of a drill string. The tungsten carbide grains shall resist melting and alloying during welding of the hardbanding. Steel is used as a matrix material merely to stick the tungsten carbide grains on the contact surface. Instead of steel other matrix materials in form of alloys were tested and it was found that the harder the matrix material the higher the wear resistance in tungsten carbide hardbanding materials.

Other suitable alloys to give protection from wear and corrosion have long been known. For example, Nickel-based alloys with additives of chromium and molybdenum are successfully involved in many branches of industry for the purposes of thermal spraying and welding, as described for example in DE 196 28 346 A1.

U.S. Pat. No. 6,482,534 B2 discloses a spray powder comprising a metal phase made of a Ni or Ni-based alloy powder which has a particle size of from 6 to 63 µm and which comprises from 75 to 95 wt % of a ceramic phase made of a powder consisting of preformed tungsten carbide particles and at least one chromium carbide powder selected from the group consisting of $Cr_3C_2$, $Cr_7C_3$ and $Cr_{23}C_6$. This powder is capable of forming a sprayed coating having extremely high toughness and impact resistance and also having excellent corrosion resistance and wear resistance in a wet environment.

In addition to its mechanical properties for withstanding mechanical stress and wear and chemical corrosion, some drilling string components should possess nonmagnetic or at least less magnetic characteristics. The reason is that during the implementation of exploratory or prospecting bores, the position and direction of the drill heads is established by magnetic measurement. Since bores extend to increasingly greater depths, an especially exact position determination is required, which is especially difficult to establish for directional bores. Moreover, the measurements of magnetic effects are susceptible to distortion, not least because of the masses of ferrous materials incorporated in the drill string and bottom-hole assembly. Distortion of magnetic measurements can give rise to unacceptable errors in the determination of position and direction of the drilling, with undesirable consequences.

Distortion of magnetic measurements in the region of the instrumentation arising from inherent magnetism should be as low as possible. This means that the drilling string components, which are located in the immediate proximity of the measuring instrumentation should exhibit the most minute degree of magnetic anomalies.

Besides that, distortion of magnetic measurements in the region of the instrumentation of conventional drill string and bottom-hole components can also be mitigated by locating the instrumentation in a special section of the drill string, which is fabricated of non-magnetic alloy.

For evaluation of the non-magnetic properties the so-called API (American Petroleum Institute;) specification may be used ("Specification for Rotary Drill Stem Elements"; page 23). The API specification specifies that the magnetic permeability shall be less than 1.010, and that the maximum deviation from a uniform magnetic field shall not exceed +/−0.05 microtesla. If a material meets these requirements it can be approved for use on non-magnetic materials. A practicable test method on magnetizability of a drill stem is described in EP 0 014 195 A1.

From Austrian Patent No. 214,466, there is known a nonmagnetic austenitic chromium manganese steel alloy for manufacturing nonmagnetic drilling string components containing each in percent by weight, carbon up to a maximum of 0.12, silicon up to a maximum of 0.6, manganese 17.0 to 19.0, chromium 11.5 to 13.0, nickel 1.5 to 2.0, molybdenum 0.4 to 0.6, nitrogen 0.1 to 0.15, the remainder being iron and the usual accompanying elements.

The materials known in the art are not suitable to meet all requirements with regard to wear and corrosion resistance as well as to nonmagnetic properties as explained hereinbefore.

It is therefore an object of the present invention to provide a material that is suitable to produce parts or coatings having a high corrosion and wear resistance, and which at the same time is nonmagnetic at ambient and drilling temperatures.

It is a further object of the invention to provide a component for use in a drill string showing low inherent magnetism and therefore, contributing as less as possible to a distortion of magnetic measurements.

With respect to the nonmagnetic material for producing parts or coatings adapted for highly wear and corrosion intensive applications as specified above, this object is achieved according to the invention by a material characterized by having a weight portion of the tungsten carbide particles which is in the range between 30 w % and 65 wt. % and wherein the Ni-based alloy is a Nickel-Chromium-Molybdenum alloy comprising: (in wt. %):

| | |
|---|---|
| Cr | 11.0-30.0 |
| Mo | 5.0-25.0 |
| Fe | 0-10.0 |
| B | 0-5.0 |
| Co | 0-2.5 |

The nonmagnetic material according to the invention is characterized by a metal phase made of a Ni-based alloy comprising at least an amount of chromium and molybdenum as specified above and a low maximum content of iron, boron or cobalt, which will be explained below in more detail. This alloy forms a relatively soft matrix when compared to the hardness of the preformed tungsten carbide particles embedded therein. The alloy may contain additional elements, especially C, Mn, Si, V, W, Cu, B, P and N as long as these elements do not negatively affect the non magnetic property of the ally. The overall content of those additional elements is less than about 25 wt. %, preferably less than about 18 wt. % and most preferred less than about 10 wt. % as it is explained below in more detail.

The use of Ni-based alloys with additives of chromium and molybdenum to give protection from corrosion has long been known. Such alloys are disclosed for example in U.S. Pat. No. 6,027,583 A. However, such an alloy may be relatively soft and therefore not beneficial for wear and abrasion intensive applications.

(f) BRIEF SUMMARY OF THE INVENTION.

Accordingly, it is essential that hard tungsten carbide particles are embedded in the metal matrix, whereby the carbide loading should be as high as possible in view of a high wear resistance. Suitable preformed tungsten carbide particles are available in several types and qualities, e.g. in the form of spherical tungsten carbide particles, fused (=cast) tungsten carbide particles or in form of the so-called macrocrystalline tungsten carbide particles (which is also known as "monocrystalline tungsten carbide). For the present invention all these types may be suitable. It may occur that carbides precipitate from a melt containing large quantities of carbon. A certain quantity of such carbide precipitates in the material may not be detrimental. However, best results were found if all or at least the greatest part the carbide particles are preformed particles of the types explained above.

Principally, the content of tungsten carbide may vary in the finished product or overlay. The content may be low to make the finished overlay or product "casing friendly" or it may be high to make the finished overlay or product "drill pipe friendly", depending upon the customer requirements. On the other hand, it was found that a high carbide loading affect the nonmagnetic properties of the alloy. It has been found that at ambient temperature the magnetism of the material increases with increasing weight portion of the tungsten carbide particles. One may assume that a certain amount of WC particles going into solution may adversely effect the magnetic properties of the material. What ever is the reason, according to the invention, the weight portion of the tungsten carbide particles is limited to 65 wt. % in order to obtain a nickel based alloy having low magnetic or nonmagnetic properties.

For ferromagnetic materials the physical property of interest is the Curie Temperature. The ferromagnetic property disappears at temperatures above the Curie Temperature. For the material according to the present invention the Curie Temperature should be as low as possible, at least equal or below to ambient temperature (30° C.). Nickel in its elemental form has a Curie Temperature of 627°K (352° C.). Many usual components of common nickel based alloys have influence on the Curie Temperature of the alloy. Iron, boron and cobalt are such components.

From a practical standpoint most nickel-base alloys contain some level of iron. However, the presence of both iron and boron is undesirable because $Fe_2B$ will likely form which is ferromagnetic with a very high Curie Temperature of 1.015

K (742° C.). The same is true for cobalt, having a high Curie Temperature of 1.388°K (1.115° C.) in its elemental form, so that cobalt is not appropriate for decreasing the Curie Temperature of the alloy.

Therefore, according to the invention, the maximum contents of iron, boron and cobalt are limited to ranges given above.

On the other hand, chromium and molybdenum are decreasing the Curie Temperature of nickel. In order to reduce the Curie Temperature to 0° C. the chromium content in a NiCr solid solution must be above 7 wt. %. In a similar way, the addition of 10 wt. % Mo will reduce the Curie Temperature of nickel to 0° C. Of course, if both elements Cr and Mo, are present, lower contents of each element are sufficient for a corresponding reduction of the Curie Temperature.

Due to practical and economical considerations, the chromium content of the metal phase should be at least 11 wt. %. The high chromium content may be suitable to balance the Curie Temperature increasing effect of other components of the alloy, or it may even be suitable to eliminate such Curie Temperature increasing effects. For example, ideally, iron and chromium will combine to form an intermetallic phase (approximately FeCr) which is non-magnetic.

The material according to the invention shows a high resistance against wear, abrasion and corrosion, and especially, it causes less distortion of magnetic measurements. As a consequence, this material is suitable for the manufacturing of less magnetic or nonmagnetic drilling string components.

It is preferred that Ni-based alloy may comprise additional elements in the following ranges:

| C  | 0-0.7     |
|----|-----------|
| Co | 0-2.5     |
| Cr | 11.0-30.0 |
| Mo | 5.0-25.0  |
| Fe | 0-10.0    |
| Mn | 0-2.0     |
| Si | 0-4.0     |
| V  | 0-0.5     |
| W  | 0-5.0     |
| Cu | 0-5.0     |
| B  | 0-4.0     |
| P  | 0-3.0     |
| N  | 0-1.0     |

Nickel makes up the balance of the composition given above, besides non-avoidable impurities or optional components of minor relevance.

A even more suitable composition of the metal phase comprises additional elements in the following ranges (in wt. %, balance=Ni):

| C  | 0-0.4     |
|----|-----------|
| Co | 0-2.0     |
| Cr | 11.0-24.0 |
| Mo | 6.0-18.0  |
| Fe | 0-7.0     |
| Mn | 0-1.0     |
| Si | 1.0-3.6   |
| V  | 0-0.3     |
| W  | 0.0-3.5   |
| Cu | 0.5-3.0   |
| B  | 0.5-2.5   |
| P  | 0-2.5     |
| N  | 0-1.0     |

Most preferred is the Ni-based alloy comprising additional elements in the following ranges (in wt. %, balance=Ni):

| C  | 0.06-0.2   |
|----|------------|
| Co | 0-1.5      |
| Cr | 18.6-21.1  |
| Mo | 11.9-13.9  |
| Fe | 2.2-5.6    |
| Mn | 0-0.3      |
| Si | 1.74-1.95  |
| V  | 0-0.21     |
| W  | 1.5-2.1    |
| Cu | 0.84-1.12  |
| B  | 1.12-1.2   |
| P  | 0-2.0      |
| N  | 0-1.0      |

It has been found that the nickel based alloy is tolerating an especially high load of tungsten carbide particles without any adverse effect on its nonmagnetic properties, if a type of tungsten carbide particles in a modification of preformed spherical tungsten carbide particles is used. Therefore, according to a first preferred embodiment of the material according to the invention, at least a part of the tungsten carbide particles are preformed spherical tungsten carbide particles.

Spherical tungsten carbide particles consist of the phases WC-$W_2C$ and they exhibit a very high hardness of about 3000 HV. A typical morphology of the spherical tungsten carbide particles is shown in FIG. 1. It is consisting of nearly perfect globular balls, which are manufactured for example by plasma spheroidization and centrifugal atomization methods. Due to its manufacturing method the iron content is low, for example about 0.09 wt. %.

The use of spherical tungsten carbide particles is the key factor to increase the carbide loading to very high values and at the same time maintaining the non-magnetic property of the material. Therefore, a material is especially preferred, wherein the weight portion of the preformed spherical tungsten carbide particles is in the range between 50 wt. % and 65 wt. %, preferably more than 55 wt. %.

The weight portion of the preformed spherical tungsten carbide particles may be more than 50 wt. % without adversely effecting the non-magnetic properties of the material according of the definition given in the API specification. It can be assumed that due to its regular shape and small surface area the solution of the spherical tungsten carbide particles in the nickel base alloy is low when compared to the solution of irregularly shaped tungsten carbide particles, which will melt more readily. If a part of the preformed spherical tungsten carbide particles is replaced by another type of preformed tungsten carbide particles then the upper limit for the total WC loading is below 65 wt. %. First results show that a material containing 35 wt. % of the above mentioned nickel based alloy and 65 wt. % of preformed spherical tungsten carbide particles maintains its nonmagnetic property. It can be expected that the weight portion of the preformed spherical tungsten carbide particles in a material according to the present invention can be increased to 75 wt. % or even to 85 wt. % without loss of the nonmagnetic property.

On the other hand, spherical tungsten carbide particles are quite expensive. Therefore, according to a second preferred embodiment of the material according to the invention, at least a part of the tungsten carbide particles are preformed fused tungsten carbide particles and their weight portion is at most 50 wt. %.

Figure 2:
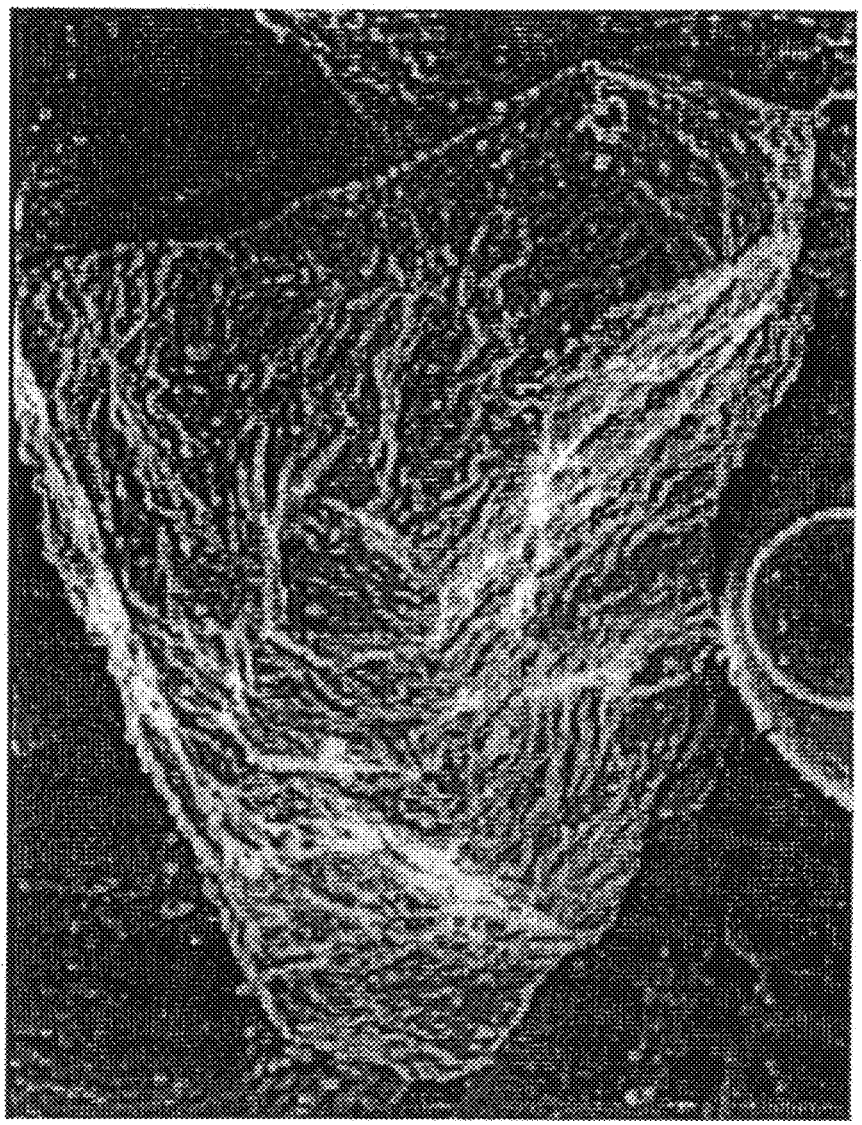

Fused tungsten carbide particles consist of the phases WC-W$_2$C. A typical morphology of a fused (=cased) tungsten carbide particle is shown in FIG. 2. The manufacturing process involves a melting step of tungsten and graphite in a crucible followed by quenching, milling and classification. Accordingly, this type of tungsten carbide is consisting of broken, irregularly shaped particles with a relative high surface area. The iron contents depends on the purity of the starting materials and the contamination coming from the milling step; typically it is about 0.3 wt. %.

As explained above, a high content of tungsten carbide is desirable with regard of a high resistance of the material against wear and abrasion. Preferably, the weight portion of the preformed carbide particles is at least 30 wt. %, most preferred at least 40 wt. %.

With respect to the resistance against wear and abrasion, the weight portion and the size and number of the preformed tungsten carbide particles are essential parameters. On the other hand, it could be expected that the amount of WC that goes into solution during application (e.g. during welding of the material) can be decreased by increasing the particle size of the tungsten carbide particles.

The best compromise and optimal results for both aspects were found, where the preformed carbide particles have a mean particle size in the range between 25 μm and 250 μm, preferably in the range between 50 μm and 180 μm.

With respect to a component, especially for use in a drill string, the above mentioned object is achieved either by a component made of a material according to the invention, or by a component comprising a base body having a coating made of a material according to the invention.

As explained above, the material according to the invention shows a high resistance against wear, abrasion and corrosion. Moreover, it causes less distortion of magnetic measurements allowing the manufacturing of less magnetic or nonmagnetic drilling string components. Therefore, such components are suitable to be use in a drill string showing low inherent magnetism.

Starting from a method as mentioned above, the object is achieved according to the invention with respect to the method for the manufacture of a component, in that a raw material is provided according to the invention, whereby during depositing of the molten material the surface of the substrate is kept at a temperature below 250° C.

Typically, when applying molten material onto a substrate in form of a layer, the substrate may be heated in order to minimize thermal stress, especially during the subsequent cooling and thereby to avoid cracks or deformation.

However, it was found that cooling of the substrate results in a lower inherent magnetism of the layer comprising a material according to the present invention. Therefore, especially at high tungsten carbide contents above 40 wt. %, the surface of the substrate is kept at a temperature below 250° C. If the substrate is heated at higher temperatures for a longer time then modifications of the micro structure of the substrate material may occur resulting in changes of its magnetic properties. Furthermore, the quenching rate of the molten material is lowered resulting in a longer period of time at high temperatures during which dissolution of tungsten carbide particles in the molten material may occur resulting in a change of the nonmagnetic properties of the finished layer.

In order to realize a forced cooling, the surface of the substrate may be cooled by an heat exchanger media like water being in contact with the substrate or by blowing a gas stream against the surface of the substrate. Then a rapid quenching of the molten material applied to the surface occurs thereby reducing the dissolving of the tungsten carbide particles in the metallic matrix. It may be assumed that dissolved tungsten carbide increases the inherent magnetism of the layer material due to its contents of iron or other elements which are suitable to effect the magnetic properties of the layer material.

The layer of the nonmagnetic material can be applied onto the substrate for example by laser welding, by induction fusing or by cold spraying. However, it has been found especially advantageous if the melting of the raw material and the applying of the layer is accomplished by flame spraying or by plasma transferred arc welding.

(g) BRIEF DESCRIPTION OF THE SEVERAL VIEWS OF THE DRAWING(S)

The invention will be better understood and objects other than those set forth above will become apparent when consideration is given to the following detailed description with reference to the Figures and Examples. In the accompanying drawings:

FIG. 1 is a copy of a microscopic photograph of spherical tungsten carbide powder as used in material according to a first embodiment according the present invention, FIG. 2 is a copy of a microscopic photograph of cast tungsten carbide powder as used in a second embodiment according the present invention.

(i) DETAILED DESCRIPTION OF THE EXAMPLES OF THE INVENTION

EXAMPLE 1

A Ni based alloy having the composition as given in Table 1 below was atomized and mixed with preformed fused tungsten carbide particles and formed into a powder.

TABLE 1

| | |
|---|---|
| C | 0.13 |
| Co | 0.42 |
| Cr | 20.80 |
| Mo | 12.96 |
| Fe | 3.26 |
| Mn | 0.10 |
| Si | 1.91 |
| V | 0.04 |
| W | 1.80 |
| Cu | 0.88 |
| B | 1.14 |
| Ni | Balance |

The Ni based alloy accounts for 55% of the total weight of the resulting material, the weight proportion of the WC particles is about 45 wt. %. The size distribution of the tungsten particle is essentially between 50 μm and 180 μm, whereby the mean particle size is about 110 μm.

The powder was used to prepare a hardbanding coating onto the cylinder surface of a drill collar by Plasma Transferred Arc (PTA). After cleaning the surface of the collar, the layer was applied on to it, of a layer thickness of 4 mm. After the spraying operation the layer slowly cooled down in order to avoid cracks.

During the coating process, the surface temperature of the collar was kept below 250° C. in order to have a short heating time and a rapid cooling of the molten material, thereby preventing solution of the tungsten carbide particles and maintaining the particles integrity. For that purpose the collar was cooled with water until the coating process has been finished.

A test on magnetizability was carried out according to the API specification. Prior to the test, the coating was subjected to magnetization at 120 kA/m. There could not be detected a single measuring point having a magnetic permeability larger than 1.010, and that the maximum deviation from a uniform magnetic field was not above +/−0.05 microtesla.

The nickel based composite hardfacing powder containing spherical tungsten carbide is designed to be applied over those surfaces of steels, stainless steels, cast irons and nickel based alloys that are subject to abrasion, corrosion, impact or any combination thereof. Deposits are hard and smooth, and resist abrasion and friction because the tungsten carbide particles are evenly distributed throughout the matrix. Despite of the very high content of tungsten carbide particles it is non magnetic according to the API specification and therefore, the alloy is particularly important in the Oil and Gas industry because of its non-magnetic properties.

EXAMPLE 2

A Ni based metallic matrix was prepared by a blend of a first Ni based alloy, a second Ni based alloy and spherical tungsten carbide particles. The compositions of the Ni based alloys as given in tables 2 and 3.

TABLE 3

| C  | 0.02 |
|----|------|
| Co | 0.70 |
| Cr | 22.60 |
| Mo | 13.60 |
| Fe | 2.90 |
| Mn | 0.17 |
| Si | 0.15 |
| V  | 0.06 |
| W  | 3.00 |
| Cu | 0.00 |
| B  | 0.00 |
| Ni | Balance |

TABLE 2

| C  | 0.30 |
|----|------|
| Co | 0.00 |
| Cr | 18.10 |
| Mo | 12.00 |
| Fe | 3.80 |
| Mn | 0.00 |
| Si | 4.55 |
| V  | 0.00 |
| W  | 0.00 |
| Cu | 2.20 |
| B  | 2.85 |
| Ni | Balance |

Both Ni based alloys are available in the market. The first alloy (Table 2) is known for example from DE 196 28 346 A1. It accounts for 40 wt. % of the metallic matrix. The second alloy (Table 3) is a high corrosion resistant alloy known in the market under the tradename "Hastelloy C22". It accounts for 60 wt. % of the metallic matrix.

The melted alloy metal was formed into a powder and a coating was applied onto the cylinder surface of a drill collar via plasma transferred arc welding using a mixture of two powders, the first one consisting of preformed fused spherical tungsten carbide particles and the second is the mixed alloy powder with the composition given above. The heating time during the coating process by plasma transferred arc process is long enough to obtain a homogeneous melt of the Ni based alloy, but the heating time is short enough to avoid a complete melting of the tungsten carbide particles. The mean particle size of the spherical tungsten carbide particles is about 110 μm.

In the coating, the Ni based matrix accounts for 40% of the total weight, and the weight portion of the spherical WC particles is about 60%.

During the coating process, the surface temperature of the collar was kept below 250° C. in order to assure a short heating time and a rapid cooling of the molten coating material, thereby preventing solution of the tungsten carbide particles and maintaining the particles integrity. Therefore, the collar was cooled with water until finishing of the coating process.

A test on magnetizability was carried out according to the API specification. Prior to the test, the coating was subjected to magnetization at 120 kA/m. There could not be detected a single measuring point having a magnetic permeability larger than 1.010, and that the maximum deviation from a uniform magnetic field was not above +/−0.05 microtesla.

The microscopic photograph of FIG. 1 is showing the morphology of the spherical tungsten carbide powder as used in Example 2. It consists of nearly perfect globular balls. Due to its manufacturing method the iron content is low, for example about 0.09 wt. %. The use of spherical tungsten carbide particles allows WC contents more than 50 wt. % (until at most 65 wt. %) without adversely effecting the non-magnetic properties. It can be assumed that due to its regular shape and small surface area the solution of the spherical tungsten carbide particles in the nickel base alloy is low.

Therefore, the content of this type of tungsten carbide particles in a metallic matrix according to this invention may be at most 65 wt. % without loosing the non-magnetic property.

The microscopic photograph of FIG. 2 shows the morphology of the fused tungsten carbide powder as used in Example 1. The manufacturing process for this WC quality involves a melting step of tungsten and graphite in a crucible followed by quenching, milling and classification. Accordingly, it consists of broken, irregularly shaped particles with a relative high surface area. The iron content is typically about 0.3 wt. %.

This type of tungsten carbide particles may undergo faster dissolution in a metallic matrix when compared to spherical tungsten carbide particles. Therefore, the content of this type of tungsten carbide particles in a metallic matrix according to this invention may be limited to 50 wt. % in order to maintain the non-magnetic property.

The invention claimed is:

1. A nonmagnetic material for producing parts or coatings adapted for highly wear and corrosion intensive applications, said material comprising preformed tungsten carbide particles which are embedded in a metal phase made of a Ni-based alloy, wherein the weight portion of said preformed tungsten carbide particles is in the range between 30 wt. % and 65 wt. % and wherein the Ni-based alloy is a Nickel - Chromium-Molybdenum alloy comprising: in wt. %, balance = Ni:

C 0.06-0.2
Co 0-1.5
Cr 18.6-21.1
Mo 11.9-13.9
Fe 2.2-5.6
Mn 0-0.3
Si 1.74-1.95
V 0-0.21
W 1.5-2.1
Cu 0.84-1.12

B 1.12-1.2
P 0-2.0
N 0-1.0.

2. A material according to claim 1, wherein the weight portion of the preformed spherical tungsten carbide particles is in a range between 55 weight percent and 65 weight percent.

3. A material according to claim 1, wherein the preformed spherical tungsten carbide particles have a mean particle size in the range between 50 μm and 180 μm.

4. A material according to claim 1, wherein the preformed tungsten carbide particles are preformed fused tungsten carbide particles and their weight portion is in the range between 30 wt. % and 50 wt. %.

5. A material according to claim 1, wherein preformed tungsten carbide particles have a mean particle size in the range between 25 μm and 250 μm.

6. A material according to claim 1 wherein at least a part of the tungsten carbide particles are preformed spherical tungsten carbide particles.

7. A material according to claim 6, wherein the weight portion of the preformed spherical tungsten carbide particles is in the range between 50 wt. % and 65 wt. %.

8. A material according to claim 6, wherein the weight portion of the preformed spherical tungsten carbide particles is in a range between 55 weight percent and 65 weight percent.

* * * * *